United States Patent [19]

Fujii et al.

[11] 4,129,072

[45] Dec. 12, 1978

[54] ELECTROSTATIC PRINTING

[75] Inventors: Motoharu Fujii, Tokyo; Takao Muramatsu, Yokohama; Noboru Koumura, Tokyo; Susumu Sugiura, Yamato; Nobuhiro Takekawa, Tokyo; Syusei Tsukada, Sagamihara, all of Japan

[73] Assignee: Canon Kabushiki Kaisha, Tokyo, Japan

[21] Appl. No.: 760,941

[22] Filed: Jan. 21, 1977

[30] Foreign Application Priority Data

Jan. 26, 1976 [JP] Japan .................................... 51-7744

[51] Int. Cl.$^2$ .............................................. G01D 15/06

[52] U.S. Cl. ............................... 101/1; 101/DIG. 13; 96/1.5 R; 346/150; 355/3 R; 118/261

[58] Field of Search ................... 101/1, DIG. 13, 131, 101/426, 465, 467; 96/1 R, 1.4, 1.5 R, 66 R; 204/15; 427/20; 346/150; 355/3 R; 118/261

[56] References Cited

U.S. PATENT DOCUMENTS

| | | | |
|---|---|---|---|
| 2,756,676 | 7/1956 | Steinhilper | 96/1 R |
| 3,033,765 | 5/1962 | King et al. | 96/1.5 X |
| 3,132,963 | 5/1964 | Jarvis | 101/DIG. 13 |
| 3,368,894 | 2/1968 | Matican et al. | 101/131 X |
| 3,759,220 | 9/1973 | Saito et al. | 101/DIG. 13 |
| 3,818,492 | 6/1974 | Matkan | 346/74 P |

*Primary Examiner*—E. H. Eickholt

*Attorney, Agent, or Firm*—Fitzpatrick, Cella, Harper & Scinto

[57] ABSTRACT

The disclosure describes an improved electrostatic printing in which cleaning step and developing step are united together as single combined step. It is possible to carry out charging step and transferring step with same single means. The electrostatic printing is adaptable for making a large number of prints at a high speed. The developing agent can be recovered and reused very efficiently.

3 Claims, 11 Drawing Figures

ELECTROSTATIC PRINTING

BACKGROUND OF THE INVENTION a. Field of the Invention

The present invention relates to electrostatic printing.

b. Description of the Prior Art

Various printing methods are known and have been used. Among them, the electrostatic printing method is known as a peculiar type of printing technique.

There are some important technical differences between the conventional printing method and the electrostatic printing method. In the former, printing ink can be selectively adhered to the surface of a printing master according to a pattern of unevenness formed on the surface or a patterned distribution of difference in affinity for solvent.

The inked surface of the master is then contacted under pressure with a sheet of printing paper so as to print it. In the latter, mechanical or physical inking to the master is not used and, instead, printing ink i.e. toner is electrostatically adhered to the surface of the master. The toner adhered to the master is then transferred to a sheet of paper to print it.

As to printing characteristics, the conventional printing method is featured by the fact that the adhesion of printing ink to the printing master is so good and stable that high speed and large quantity printing may be allowed. However it has the drawback that the printing ink may adhere to undesired parts or articles so as to form ink stains. On the contrary, the electrostatic printing method is unsuitable for high speed printing because the adhesion of toner to the master is so unstable that it cannot endure the severe printing conditions required for high speed printing. But, since the method does not use common printing ink, there occurs almost no problem of dirt and stain. For this reason, electrostatic printing is called "clean printing" in contrast with the conventional printing processes and has been expected to be employed more widely. Nevertheless, until now, its practical use has been limited to a narrow field of application. This is because the electrostatic printing method is behind the conventional one in the sharpness of printings and the number of sheets which can be produced from one and same printing master.

Typically, a printing master for electrostatic printing is made by either forming dielectric image on a conductive support or forming a conductive image on a dielectric support. To form the image on the support, two alternative processes may be employed. One is to apply an image-wise pattern of dielectric or conductive lacquer onto the support. In another process, the support is coated with photosensitive lacquer and then subjected to an image-wise exposure. Thereafter, the exposed portion or unexposed portion is cut out by an etching technique.

When such a master, for example, a master having a dielectric image portion is used, the most common electrostatic printing process comprises the steps of charging the image portion with a static charge so as to form a corresponding static image, developing the static image with charged toner of opposite polarity to that of the static image and transferring the toner image to a transfer sheet, and a cyclic repeat of the steps.

The printed matters produced by this electrostatic printing process lack adequate sharpness of print. Furthermore, the durability of the printing master is not so good. There is thus room for improvement and development in the electrostatic printing. The poor durability of the electrostatic printing master is attributable to the fact that the uneven surface by which an image is formed, is easily damaged by mechanical friction during the printing process. The abrasion of the image surface will cause irregular charging. High resolving power cannot be attained by an image-wise pattern of unevenness. Therefore it is technically difficult to produce printings having a high resolving power by using such a printing master the image surface of which is formed by a pattern of unevenness. Further, with the image formed by a pattern of unevenness, it is difficult to obtain a halftone image or a gradational image.

In the electrostatic printing method with the use of the printing master as described above, the step of cleaning is essential. The transferred image obtained by the process without cleaning step is inferior to that obtained by the process including cleaning step in respect of quality, in particular, of sharpness and resolving power. Without a cleaning step, the adjustment of the developing condition also becomes very difficult. The cleaning step is inevitably necessary for the practical use of the electrostatic printing method. In the electrostatic printing machines hitherto known, the developing agent recovered from the cleaning station has been disposed as waste. Otherwise, the developing agent has been gathered at a definite recovery place and thereafter has been circulated to the developing station for reuse through a regenerator or the like. The recovery and circulation of developing agent have various difficulties. To overcome the difficulties, there have been made various attempts and devices.

At any rate, the known electrostatic printing apparatus necessitates a cleaning device and a developing device separately provided. As a result, the overall size of the apparatus has necessarily become large.

SUMMARY OF THE INVENTION

Accordingly, the primary object of the invention is to provide an improved electrostatic printing method which overcomes the above mentioned disadvantages and difficulties of the electrostatic printing method using the printing master hitherto known.

Another object of the invention is to provided an improved electrostatic printing method which allows the steps of cleaning and developing at the same station as a single combined step of the printing process.

A further object of the invention is to provide an improved electrostatic printing method in which, in the cycle of the printing process, the cleaning step is carried out after the charging step and before the developing step.

Still a further object of the invention is to provide an improved electrostatic printing method in which the charging step and the transferring step can be carried out by one and same means.

Also it is an object of the invention to provide an electrostatic printing apparatus in which remaining developing agent is recovered efficiently and in an improved manner.

In a broader sense, the method of the present invention is characterized in that as essential steps, charging step, cleaning-developing combined step and transferring step are carried out on an electrostatic printing master comprising a dielectric medium having an electric resistance sufficient to hold a static charge and a layer composed essentially of silver image carried by the medium.

According to the preferred embodiment of the present invention, the electrostatic printing method allows one step of the process to serve both as the charging step and the transferring step.

According to the invention, a high speed printing and a printing for a large number of sheets from the same master become possible by using the electrostatic printing process. Since the developing agent is electrostatically adhered to the image surface of the printing master, the problem of ink dirt and stains can be substantially eliminated. Although the method of the invention also needs the step of cleaning, the cleaning-developing combined step solves the problem of circulation path of developing agent for its recovery. Therefore, the problem of blockage in the recovery path is solved at the same time. Furthermore it makes the maintenance of the apparatus very easy and also allows the whole apparatus to be made compact and smaller in size.

Other and further objects, features and advantages of the invention will appear more fully from the following description.

DESCRIPTION OF THE PREFERRED EMBODIMENTS

Now the invention is described in detail with reference to the accompanying drawings.

Figure 1:
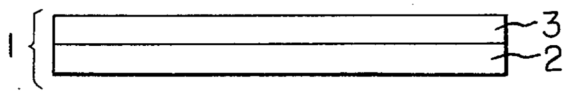
FIG. 1 shows one example of photosensitive body used for forming an electrostatic printing master adoptable in the invention.

Generally the electrostatic printing master used in the invention is made of suitable photosensitive body of silver salt. FIG. 1 illustrates one typical example thereof. The silver salt photosensitive body 1 consists of a conductive support 2 and a silver salt layer 3 carried thereon. The silver salt layer 3 is composed essentially of conventional silver salt compound and dielectric medium. Typical examples of such layer include those of silver halogenide photographic emulsions, high resolving Lippmann's emulsions, high resolving power dry plate emulsions and silver salt emulsions for plate making such as direct positive emulsion. All of these emulsion layers are photosensitive materials well known in the art, which form silver images by wet developing process after exposure. Other photosensitive materials which form silver images by dry developing process also may be utilized, in the invention and have the particular advantage of simplicity of developing treatment. As an example, mention is made of photosensitive material containing organic silver salt, reducing agent and halogenide contained in dielectric medium as minor component relative to the organic silver salt. It is rather recommendable to use the latter mentioned type of photosensitive materials in the invention because these materials allow to form silver images by simple heat developing treatment after image-wise exposure and, therefore, the process including the steps of forming an electrostatic printing master from an original and forming an electrostatic image can be carried out continuously and instantaneously. These dry developing type of photosensitive materials have not yet been used so widely in the art as the wet developing type ones have. For the sake of explanation, some examples of the components of the dry developing type of photosensitive materials as well as of the treating method for the same are given below.

Examples of the organic silver salt include silver salts of organic acids such as behenic acid, arachidic acid, stearic acid, palmitic acid, myristic acid, lauric acid, caprylic acid and acetic acid, and further silver uralate and silver hydroxystearate, and organic silver compounds such as silver benzoate, silver phthalazinon, silver benzotriazol, silver saccharin, silver 4-n-octadeciloxy-diphenyl-4-carboxylic acid, silver-o-aminobenzoate, silver-acetoamidbenzoate, silver phloate silver camphorate, silver-p-phenylbenzoate, silver phenylacetate, silver salicylate, silver butyrate, silver terephthalate, silver phthalate and silver acid phthalate.

As halogenide, various inorganic halogenides including the following examples, wherein X=Cl, Br and I, may be used: $NH_4X$, AgX, $CrX_2$, $IrX_4$, $InX_4$, $CoX_2$, $CdX_2$ KX, HX, $SnX_2$, $SnX_4$, $SrX_2$, $So_2X_2$, $TiX_3$, $TiX_4$, $CuX_2$, NaX, CaX, $PbX_2$, $NiX_2$, $PdX_2$, $MgX_2$, $Al_2X_3$, $ZnX_2$, $MnX_2$, $BaX_2$, $KAuCl_4$, $BiX_3$, CsX and $FeX_3$. If necessary, sensitizer, toning agent, stabilizer and other additives may be added.

To develop the silver image formed in the photosensitive layer, it is subjected to a heat treatment. To this end, reducing agent such as substituted phenol or substituted naphthol has previously been incorporated into the photosensitive layer or coated onto the surface of the layer.

Suitable reducing agents are, for example, hydroquinone, methylhydroquinone, chlorohydroquinone, bromohydroquinone, cathechol, pyrogallol, methylhydroxynaphthalene, aminophenol, 2,2′-methylene-bis(6-t-butyl-4-methylphenol), 4,4′-bithylidene-bis(6-t-butyl-3-methylphenol), 4,4′-bis(6-t-butyl-methylphenol), 4,4′-thiobis(6-t-2-methylphenol), 2,6-di-t-butyl-p-cresol, 2,2′-methylene-bis(4-ethyl-6-t-butylphenol), phenedon, methol, 2,2′-dihydroxy-1,1′-binaphthyl, 6,6′-dihydroxy-1,1′-binaphthyl, bis(2-hydroxy-1-naphthyl) methane and their mixtures.

It is also possible to carry out a hot developing treatment externally without incorporating the developing agent (reducing agent) into the photosensitive layer. For example, a developing solution of the above-mentioned reducing agent in a buffer solution adjusted to have a lower PH value may be applied to the photosensitive layer. Fixing may be carried out with ordinary sodium thiosulfate solution.

Examples of solvents which may be used to disperse the organic silver salt into the dielectric medium include methylene chloride, ethane tetrachloride, ethane 1, 1, 2 trioxide, ethylene trichloride, ethane tetrachloride, propane 1, 2 chloride, ethane 1, 1, 1 trichloride, carbon tetrachloride, ethyl acetate, butyl acetate, isoamyl acetate, cerosolve acetate, toluene, xylene, acetone, methylethylketone, dioxane, tetrahydrofuran, dimethyl amide, N-methylpyrolidone, alcohols such as methyl alcohol, ethylalcohol, isopropyl alcohol and butyl alcohol and water.

As dielectric medium, various esins may be utilized including, for example, polystyrene-, polyvinyl chloride-, phenol-, polyvinyl acetate-, polyvinyl acetal-, epoxy-, xylene-, alkyd-, polycarbonate-, polymethyl methacrylate-, polyvinyl butytal- and gelatin resin, polyesters, polyurethanes, synthetic rubbers, polybutene and polyvinyl acetate.

If required, plasticizer may be added. Examples of suitable plasticizer include dioctyl phthalate, triglycil phosphate, diphenyl chloride, methyl naphthalene, p-terphenyl and diphenyl.

To make the electrostatic printing master, any other suitable photosensitive material known in the art may be used. For example, photosensitive materials which are known as materials for silver image forming by diffusion transfer process may be employed. In this case, negative material with a gelatin layer containing silver halide is exposed and, thereafter, immersed in a solvent to dissolve the silver halide. Further, in the same solvent, it is closely contacted with positive material with a gelatin layer containing colloidal silver. Thereby the silver halide corresponding to the unexposed area in the negative material is dissolved out in the solvent and then diffused into the gelatin layer of the positive material so that a positive silver image may be formed with the colloidal silver in the positive material serving as developing nucleus through the reduction of the diffused silver halide followed by the deposition of the silver.

As another example, a silver image forming method so called "autopositive" may be employed. In this case, a photosensitive material with a gelatin layer containing silver halide is at first exposed in the manner of overall exposure and thereafter an image-wise exposure is carried out on it. As a result, in the area subjected to the image-wise exposure, the silver in the layer loses its capability for reduction depositing due to Herschel's effect at the subsequent developing process and only in the remaining part of the layer, silver is deposited so as to form a silver image.

Further example of useful photosensitive material is such sort of material which has a silver halide layer vapor-deposited on it. The silver halide layer may be treated by the conventional process of exposure, development and fixation to form a silver image.

Other possibility for silver image forming is to employ the process known as photo-solubilization. In this process, after a gelatin layer containing silver halide has been fixed using mercapto or thiourea, it is exposed, developed and washed so as to form a silver image.

Generally the photosensitive body having a photosensitive layer is made by applying a film of photosensitive material onto a suitable support. To this end, any known method for forming a film from synthetic resin may be used. For example, emulsion solution can be coated on a support according to the technique of roller coating, wire bar coating, casting or air-knife coating to form a desired film layer having an adjustable-width in the range of from some $\mu$ to about $100\mu$.

The support may be a metallic plate of aluminum, copper, zinc or silver, metal laminated paper, surface treated paper allowing no penetration of solvent, paper treated with conductive polymer, synthetic resin film containing surface active agent incorporated into the film, and glass, paper or synthetic resin film which has a surface layer of metal, metal oxide or metal halogenide adhered to it by vapor deposition method. Also, dielectric glass, paper or synthetic resin may be used.

When a conductive support is employed, the surface specific resistance of the support should be less than that of its photosensitive layer. All conductive supports the surface specific resistance of which is less than $10^9\ \Omega$ cm, preferably less than $10^5\ \Omega$ cm may be used. Flexible metallic sheet, paper and other conductive material wrapped around a drum are particularly preferable.

Figure 2:
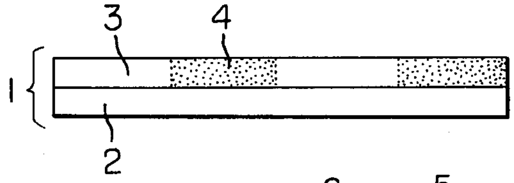
FIG. 2 shows the photosensitive body in which silver image has been formed.
Figure 3:
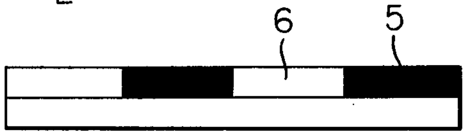
FIG. 3 shows one example of electrostatic printing master.

With the photosensitive body composed of photosensitive material selected from various types of silver image forming materials as mentioned above and any suitable support as also exemplified above, a master for electrostatic printing can be formed as illustrated in FIGS. 2 and 3.

The photosensitive body 1 is image-wise exposed so as to form a latent image 4 in the exposed area of the photosensitive layer 3 (FIG. 2). Subsequently, a developing treatment is carried out and thereby a silver image 5 carried in the dielectric medium is formed as shown in FIG. 3. In the non-image portion 6, there is formed no silver image. It is generally recommendable to adjust the electric resistance of the silver image portion to a value less than $10^{10}\ \Omega$ cm. For the non-image portion, an electric resistance more than $10^{10}\ \Omega$ cm more preferably $10^{11}\ \Omega$ cm, in particular more than $10^{13}\ \Omega$ cm is recommendable.

The width of the layer in which the silver image is carried may be selected at discretion taking its use and durability into consideration. Usually the range of 1–50 is preferable.

The basic process of the electrostatic printing method according to the invention is carried out with the printing master formed as mentioned above and comprises the steps of charging, developing, transferring and cleaning, all of which steps or the steps of cleaning developing and transferring (charging) are cyclically repeated. If use is made of such an electrostatic printing master that is formed from a heat sensitive, photosensitive body, the process necessary for forming the master, namely the steps of image-wise exposure and heat development may be incorporated into the basic electrostatic printing process as a preliminary steps of the process so that a continuous printing process may be attainable. Additional steps such as fixing step may be also incorporated into the basic process as required.

Figure 4:
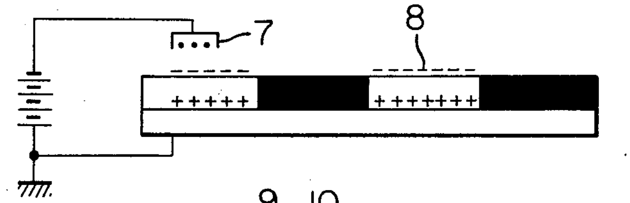
FIGS. 4 through 7 illustrate one embodiment of the electrostatic printing method according to the invention, showing charging step in FIG. 4, developing step in FIG. 5, transferring step in FIG. 6 and cleaning step in FIG. 7 respectively.
Figure 5:
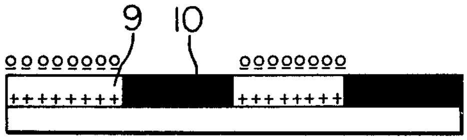
Figure 6:
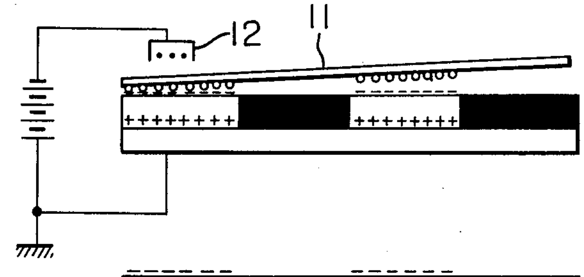

FIGS. 4 through 7 illustrate the most basic process of the electrostatic printing method. The master carrying thereon a silver image is charged, for example, by passing it under a negative corona electrode 7 so that a negative charge 8 may be produced in the surface area where no silver image exists (FIG. 4). Instead of the negative corona electrode, a positive corona electrode or an alternating current corona electrode may be used. Also a contact electrode may be used in lieu of corona electrode. At all events, by the charging step of FIG. 3, there is formed a latent image of static charge selectively in the area where no silver image exists. The latent image of static charge is developed with toner in a conventional manner such as by cascade development, magnetic brush development, liquid development, magnetic dry development and water development (FIG. 5). In this step, if the toner particles are electrically conductive and have no charge specially loaded or have any charge of opposite polarity to that of the latent image, they will adhere to the charged area 9 of the master. On the contrary if the used toner particles have any charge of the same polarity as that of the latent image, then they will adhere to the noncharged area 10. The toner image is transferred to a transfer material 11 (FIG. 6). This transferring step can be carried out, for example, by bringing the transfer material 11 into contact with the toner image surface under the influence of a corona electrode 12 of the opposite polarity to that of the toner, located on the backside of the transfer material 11.

The transferred toner image can be fixed by using the well-known technique for this purpose. Usually heat fixing method or solution fixing method are employed. In case of liquid fixation, it necessities only drying. Also, a pressure fixing method may be used.

Figure 7:
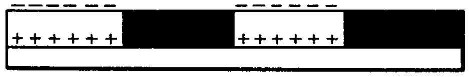

After the transferring step, the remaining toner particles are wiped from the surface of the master with suitable cleaning means such as brush, fur brush, clothes and blade so as to clean the master as shown in FIG. 7.

The electrostatic printing process is carried out cyclically repeating the above steps of charging, developing, transferring and cleaning. Since the static latent image remains unchanged and can be used for the following cycles, the printing process may be continued by cyclic repeat of only the steps of cleaning-developing and transferring.

Electrophotographic images can be produced in the conventional manner. For example, the master is passed through several times under a corona discharge device adjusted to +6KV so as to give it positive static charge the voltage of which may ranges from 0 to 1,500V.

The polarity of the corona discharge may be positive or negative and either of DC corona and AC corona may be utilized. It is also possible to effect static charging by directly contacting an electrode with the photosensitive body. The potential level of static charge should be adjusted to a sufficiently low value to avoid the dielectric breakdown or sparking.

Figure 8:
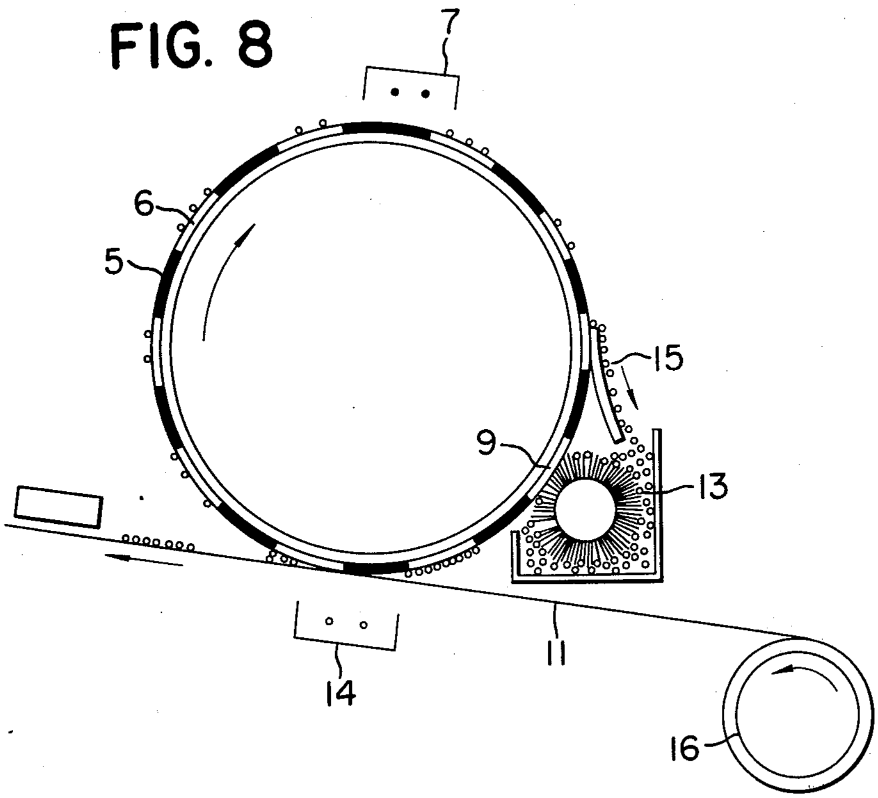
FIG. 8 is a schematic view of an electrostatic printing apparatus with which the steps shown in FIGS. 4 through 7 are repeatedly carried out.

Now, referring to FIG. 8, one embodiment of the present invention is described. As shown in the drawing, an electrostatic printing master containing silver image portion 5 and nonimage portion 6 is wrapped around a conductive rotary drum which is rotated in the direction indicated by the arrow. Being rotated, the master is charged with a corona electrode 7 and subjected to a magnetic brush developing treatment with developing agent 13 i.e. toner particles. Thereby, the toner is selectively and electrostatically adhered onto the static charged nonimage portion 9. The developed toner image is transferred to a sheet of transferring material 11 supplied from a storage roll 16, under the influence of a transfer corona electrode 14 to which usually an electric field of the opposite polarity to that of the toner charge is applied. The transferred toner image is fixed by a fixing device so as to produce a printed matter. After the transference of the toner image, the printing master is cleaned with a cleaning means 15 i.e. a cleaning blade and, if necessary, the cleaned master may be charged again with the corona electrode for the next cycle of the printing process. This recharging may be done also by means of the transfer corona electrode 14 instead of the corona electrode 7. The toner wiped by the cleaning means falls directly into the reservoir of the developing agent 13 for reuse. In this respect, it should be noted that the distance from the toner recovering place (toner wiping down place) to the reusing place (developing station) is very short. This is of importance and has the advantage that toner blockage which is known to frequently occur is eliminated and there is no need for a temporary accumulation of the recovered toner.

Figure 9:
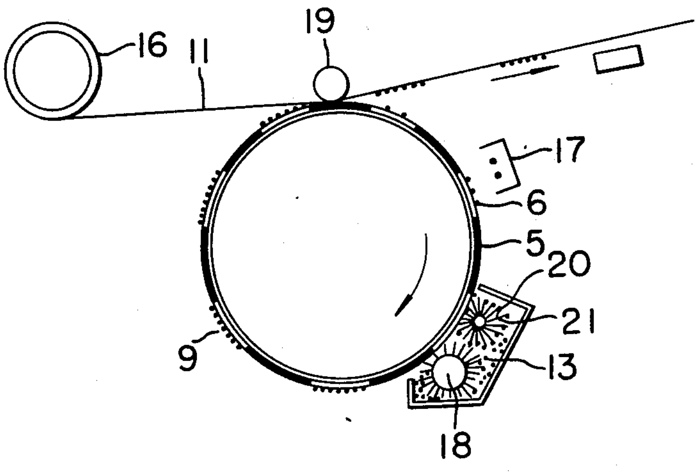
FIGS. 9 through 11 show further embodiments of the invention respectively.
Figure 10:
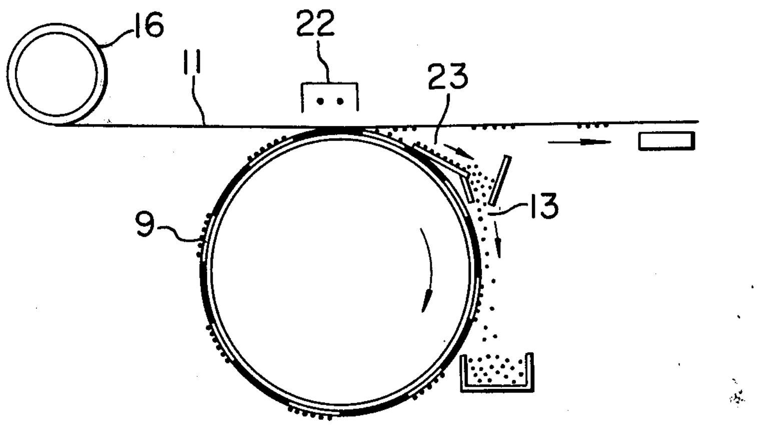
Figure 11:
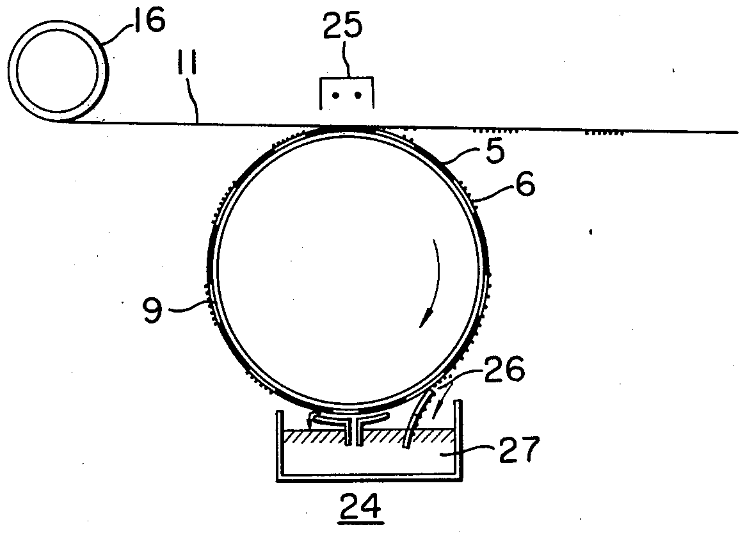

Further embodiments of the present invention are illustrated in FIGS. 9–11.

In the FIG. 9 embodiment, the master on a conductive drum is rotated in the direction of the arrow and charged with a corona electrode 17. After charging, development is carried out using a magnetic brush 18 formed by developing agent 13 i.e. toner particules. Thereby, the toner is adhered selectively to the nonimage portion 9 carrying static charge. The developed toner image is transferred to a sheet of transferring material 11 supplied from a storage roll 16, under the action of a transfer roller 19. If it is required, an electric field the polarity of which is opposite to that of the static charge on the toner may be applied to the transfer roller 19. The transferred toner image is fixed by a fixing device so as to give an electrostatically printed matter. After transferring, the printing master may be recharged by the corona electrode as desired and a magnetic brush development may be carried immediately after cleaning the master by means of a fur brush 20. The toner particles trapped on the fur brush are scraped off by means of a suitable scraper such as a flicker rod 21 so that the toner particles may fall into the toner reservoir for reuse.

The embodiment of FIG. 10 is essentially the same as that of FIG. 8 and the difference is found only in developing procedure. In the embodiment of FIG. 10, the master carrying a latent image formed thereon is developed with the same developing agent 13 according to the known procedure of so called "cascade development" and the developed toner image is transferred using a corona electrode 22. A cleaning blade 23 is used to clean the master for the next development. The toner gathered and recovered by the cleaning step may be reused directly for cascade developing.

In the embodiment of FIG. 11, the master carrying latent image is developed with the use of a liquid developing device 24 and the developed image is transferred to a transfer sheet by the effect of a corona electrode 25. The transfer sheet to which the image has been transferred is dried and subjected to a fixing treatment. The master is cleaned by a cleaning blade 26 to prepare itself for the next development. The developing agent recovered by the blade 26 is directly returned to the reservoir 27 for reuse.

As will be seen from the foregoing, the present invention provides a very compact electrostatic printing apparatus in which the cleaning station and the developing station are united together. The apparatus has the shortest possible transporting path for the recovered toner. Therefore, the recovered toner is returned to its reservoir making use of gravity without any particular power source for transporting the recovered developing agent. This means a substantial reduction of power cost and the like. Furthermore, such a prompt turning back of the recovered developing agent constitutes an effective supplemental means to a toner supply device with a limited capacity. This is very advantageous in particular when a numbers of copies have to be made for a relatively short time accompanying a large amount of consumption of toner.

While the invention has been particularly shown and described with reference to preferred embodiments thereof, it will be understood by those skilled in the art that the foregoing and other changes in form and detail can be made therein without departing from the spirit and scope of the invention.

What we claim is:

1. An electrostatic printing apparatus which comprises:

an electrostatic printing image carrier comprising essentially a dielectric medium having an electric resistance sufficient to hold a static charge and a layer composed essentially of silver image carried by the medium;

charging means for charging the dielectric medium with a static charge corresponding to the same;

developing means for developing with developing material the latent image formed on said image carrier corresponding to the static charge;

cleaning means for cleaning the surface of the image carrier after charging and before developing, said cleaning means being provided within said developing means so that the developing material removed from the image carrier by said cleaning means is redeposited in said developing means; and transferring means for transferring the image developed on the dielectric medium from said image carrier to a transfer material.

2. An electrostatic printing apparatus as claimed in claim 1 wherein the layer composed essentially of silver image is a layer of silver image formed from free silver formative silver salt compound.

3. An electrostatic printing apparatus as claimed in claim 1, wherein said charging means and said transferring means are operated simultaneously.

* * * * *